United States Patent
Byrd

[11] Patent Number: 5,762,225
[45] Date of Patent: Jun. 9, 1998

[54] COMPOST CONTAINER

[76] Inventor: James E. Byrd, 14802 Hickorytex Dr., Humble, Tex. 77396

[21] Appl. No.: 688,204

[22] Filed: Jul. 29, 1996

[51] Int. Cl.$^6$ .................................................. B65D 5/42
[52] U.S. Cl. .......................... 220/6; 229/109; 229/23 R; 220/802; 220/630
[58] Field of Search ........................ 220/6, 907, 908, 220/625, 630, 636, 797, 798, 802; 229/109, 110, 108, 23 R

[56] References Cited

U.S. PATENT DOCUMENTS

| | | | |
|---|---|---|---|
| 3,261,533 | 7/1966 | Repking | 229/109 |
| 4,359,182 | 11/1982 | Perkins | 229/109 |
| 4,823,956 | 4/1989 | Belisle | 229/109 |
| 5,257,734 | 11/1993 | Bartle | 229/109 |

*Primary Examiner*—Joseph M. Moy
*Attorney, Agent, or Firm*—Harrison & Egbert

[57] ABSTRACT

A compost container having a plurality of panels arranged in a multi-sided geometric configuration. The plurality of panels defines an interior volume for receipt of compost material. At least one of the plurality of panels is openable for accessing the interior volume. A first side member is affixed to one end of the plurality of panels. A second side member is affixed to an opposite end of the plurality of panels. The first and second side members enclose the interior volume. Openings are formed on the plurality of panels and the first and second side members so as to have a total area of at least 5% of a total surface area of the plurality of panels and the first and second side members. The plurality of panels are arranged in an octagonal configuration.

5 Claims, 3 Drawing Sheets

COMPOST CONTAINER

TECHNICAL FIELD

The present invention relates to containers. More particularly, the present invention relates to containers for receiving compost material for the purpose of biodegrading the compost material.

BACKGROUND ART

Dealing with waste material produced in ordinary household living has long been a problem, which has been dealt with in a variety of ways. Probably the most simple way to deal with household waste, or at least a very high percentage of it, is to contain all of the waste in one container. Periodically, the waste in the container is removed and relocated to either a larger container or to a waste storage site. In modern society, most residences have a service provided whereby refuse is regularly removed to some sort of waste storage site such as a landfill site or the like. Given that waste is accumulating at a tremendous, and even unbelievable rate, it is well documented that problems exist in terms of the size and number of garbage dumps and landfill sites that are required by modern society. Furthermore the cost of collecting such amounts of garbage is enormously high.

In such a system as described above, whereby all household waste material is contained together, then there indeed would be a number of very different types of waste all combined together. Such types of waste would include organic food waste, both animal and vegetable, inorganic food waste, paper products, metals, glass, plastics, yard wastes, which are typically organic and also a small percentage of other wastes.

Combining all such wastes together and storing in some sort of storage location, such as a garbage site or landfill site, can create problems. One such problem is that enormous amounts of waste are collected in whatever type of waste storage site, and are neither reused or recycled, thus producing very large waste storage sites containing vast amounts of waste. It is estimated that in North American society, for every one million people, about five hundred thousand metric tons of waste is produced every year, and with present methods of waste disposal, very little of this is reused.

Another problem is that in order for any of this waste to be reused, it would need to be sorted. Given that it has already been combined together, such sorting is very difficult, time consuming, expensive, messy, and generally undesirable. Obviously, it is necessary that waste be sorted as it is produced, if it is to be reused.

Still another problem exists with throwing away refuse, in that once something is disposed of into a garbage dump or a landfill site, it most likely will never be used again. More material must be used to replace whatever is thrown away. This means that whatever is being produced is being drawn from a supply of new material that is ultimately not being fully replenished. Unfortunately, supplies of all materials are limited, even if they are vast. While this is not quite as true for organic materials as it is for some other types of materials, it is still highly advantageous to conserve organic material for composting rather than contain it in waste storage sites. The fertilizing materials and minerals found in the compost must be replaced from another source if they are not reintroduced back into the soil through composing. Supplies of fertilizer such as peat moss or synthetic fertilizer are not unlimited, however. It is also preferable to introduce natural types of soil nutrients into the ground rather than a synthetic product.

In order to reduce the amount of waste produced by modern society it is possible to both recycle and to compost. Recycling applies to industrial materials such as paper, metals, glass, plastics, and so on. Composting, applies more particularly to organic food waste and organic yard waste. It can be done very easily on a household by household basis. In order to compost, organic material, such as food waste and yard trimmings, are simply kept in a pile where the material can remain somewhat moist. It is also possible to add already composted material in order to get the composting process started more quickly. More organic material is added on an ongoing basis and is mixed in with the material already there. It is preferable that the pile be about one cubic meter in volume, but the process certainly will work as the compost pile is built up to this size. Materials such as fruits, vegetables, egg shells, grains, grass clippings, leaves, and plant remains are all suitable for composting. It is important to use some materials with a high carbon content such as leaves and materials with a high nitrogen content such as kitchen scraps and grass clippings. Composting is merely the method by which organic wastes are broken down through self-sustaining catalytic exothermic reactions. The organic matter used in the composting process is returned to the soil in a form that is usable by other plants and promote plant growth. Introduction of properly composted material to soil helps make the soil rich and organic, and much more suitable for growing plants.

For proper composting it is necessary that the organic material be collected together in a damp but not overly wet environment. It is also necessary that a certain amount of air flow past and even through the mass of organic waste, since oxygen is required for the biological processes and the decomposition. The material must however be heaped together such that not enough air reaches it to dry out the material, or cool it down too much or too quickly. If there is not enough oxygen, then the composting process becomes an anaerobic one. Such an anaerobic process produces and utilizes a different kind of bacteria, which are malodorous. Furthermore, the process does not produce true compost.

It is also necessary that the material be mixed around so that all the material be exposed to the composting process. Such mixing allows material that may not be composting quickly or not very far along in the composting process to be mixed with material that is already fairly well composted. Such mixing will help catalyze the less developed composting process. Typically, this is quite helpful in getting material that has been newly introduced into a composting pile to get started more quickly in the composting process. Another advantage of composting is that a large percentage of household waste, estimated at between one third and one half, can be composted. Elimination of such a large percentage of household waste to be thrown out, reduces the cost of moving and relocating waste and also reduces the amount of waste in garbage dumps and landfill sites.

The most primitive form of providing means for composting is to simply pile the appropriate waste on the ground and mix the waste around such that proper composting can take place. This has several disadvantages, such that it is not protected from either animals or the environment, it looks unsightly, and it might not pile up properly, as is necessary for composting, but instead could tend to spread out too much.

Another fairly well known method is to take a length of snow fence and place it such that it forms a circle of about three feet in diameter. It is necessary to secure the fence in one or two places by driving the stakes into the ground and then tying stakes to parts of the fence, or some sort of similar arrangement. This arrangement is fairly inexpensive, it allows for proper aeration, and allows for access for turning the compost. However, the structure is not overly sturdy and also is not very aesthetically pleasing. It does not absorb very much solar energy, which is useful to keep the composting reaction relatively warm. It is also not very weather proof, which is necessary for keeping excessive moisture out.

Another popular way is to make a composting frame out of lengths of wood and then staple or generally hasten fencing or chicken wire on the inside. The generally accepted ideal size is about one cubic meter or a bit less. Problems similar to those encountered with a snow fence arrangement are also encountered with this arrangement, except that a frame made from wood can be quite sturdy.

There are also composters available that are prefabricated, such as wire compost bins. Such bins are typically made from four wire posts that are embedded into the ground with fencing spanning therebetween. Again, the problems encountered with prefabricated wire compost bins are virtually the same as those encountered with a snow fence compost bin. One advantage with a prefabricated wire compost bin is that it takes very little time to set up or take down.

One type of compost bin that is more modern and overcomes some problems associated with more primitive types of compost bins is a tumbler type of bin, such as a Green Magic Tumbler (TM). The Green Magic Tumbler comprises a plastic barrel that is mounted rotatably on a metal frame. The tumbler has a lid secured on the top and a number of vent holes for aeration. In order to mix the compost, the barrel is simply turned over as desired. Due to the relatively small size of the lid, it is difficult to turn the compost using a pitchfork, compost aerating tool, or whatever. Use of such devices to turn the compost provides for much better mixing of the material being composted. This tumbler also has other problems associated with it as it is expensive and it does not hold as much compost as most other compost bins.

In the past, a great deal of effort has been carried out so as to develop household composting containers. Unfortunately, many household composting containers are relatively large composting machines that are quite expensive and relatively unattractive. Other composting units have a round configuration. Such a round configuration inhibits the ability to properly compost the waste. Instead of mixing the material on the interior of a round container, the compost tends to slide along the round interior walls of the compost container. Additionally, such round composting containers tend to roll away under windy conditions.

It is an object of the present invention to provide a compost container that effectively biodegrades the compost material.

It is another object of the present invention to provide a compost container that effectively mixes the contents on the interior of the container.

It is a further object of the present invention to provide a compost container that is easy to use, easy to assembly, and relatively inexpensive.

It is a further object of the present invention to provide a compost container that can be easily packaged, stored, and transported.

These and other objects and advantages of the present invention will become apparent from a reading of the attached specification and appended claims.

SUMMARY OF THE INVENTION

The present invention is a compost container that comprises a plurality of panels arranged in a multi-sided geometric configuration. The plurality of panels define an interior volume for the receipt of compost material. At least one of the plurality of panels is openable for accessing the interior volume. A first side member is affixed to one end of the plurality of panels. A second side member is affixed to an opposite end of the plurality of panels. The first and second side members serve to enclose the interior volume.

The plurality of panels and the first and second side members have openings formed therein so as to have a total area of the openings of at least 5% of a total surface area of the plurality of panels and the first and second side members. The plurality of panels are arranged in an octagonal configuration.

The first side member has a flat surface extending transverse to the plurality of panels. The first side member has a panel mating means extending transverse to the flat surface. The panel mating means serves to attach to one end of the plurality of panels. This panel mating means includes a receptacle area which defines a slot in a form of the multi-sided geometric configuration. One end of the plurality of panels is affixed within the slot. The second side member has a similar configuration as the first side member.

The openable panel includes a frame panel having one end affixed to the first side member and an opposite end affixed to the second side member. The frame panel has an opening therein. A closure panel is hingedly connected to the frame panel. The closure panel is movable between an open position and a closed position. The closed position serves to cover the opening of the frame panel. In particular, the closure panel has a button member affixed thereto. The frame panel has a button receptacle thereon. The button receptacle detachably receives the button member when the closure panel is in the closed position.

DETAILED DESCRIPTION OF THE INVENTION

Figure 1:
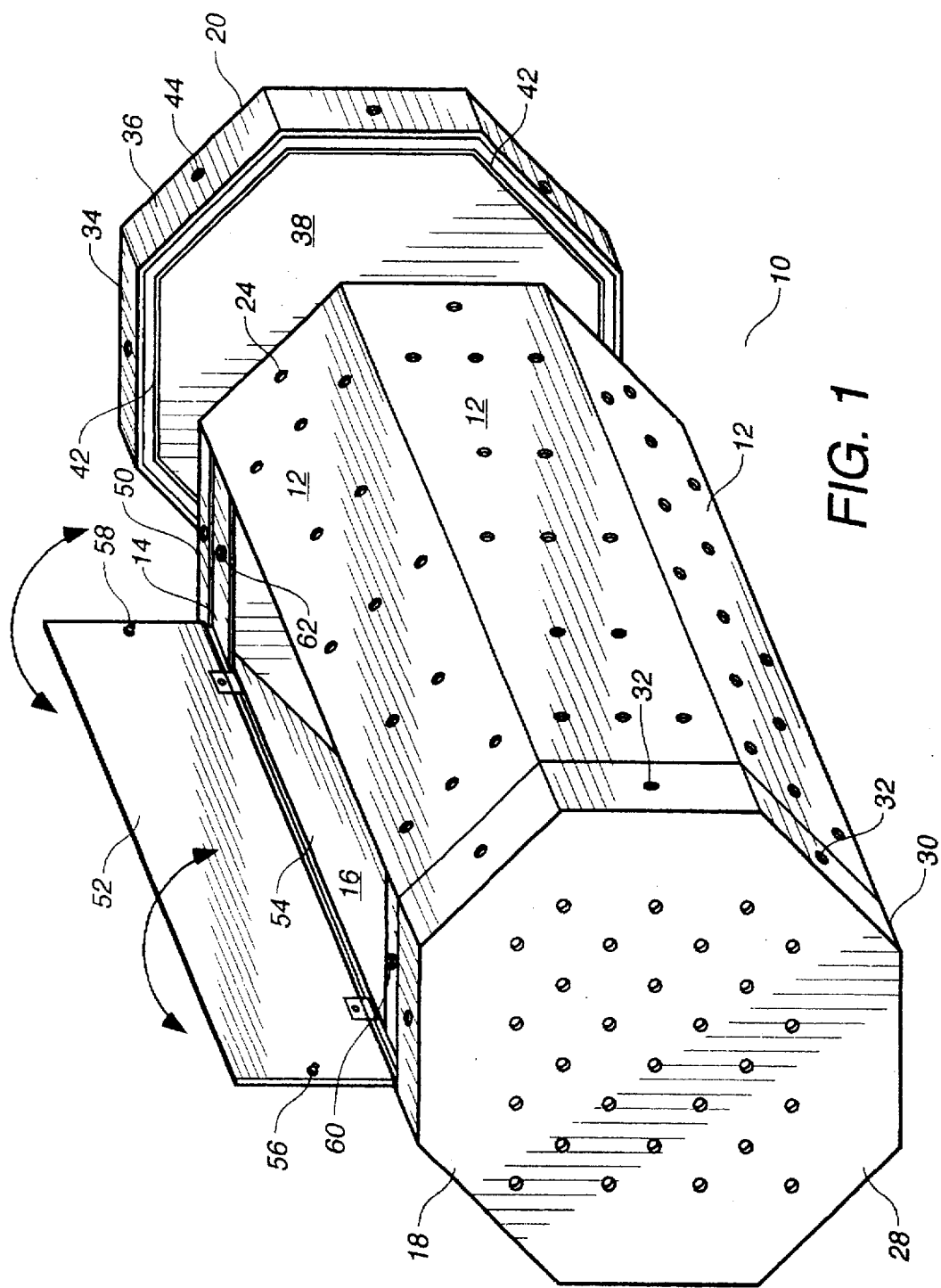
FIG. 1 is a perspective view of the compost container in accordance with the present invention.

Referring to FIG. 1, there is shown at 10 the compost container in accordance with the teachings of the present invention. The compost container 10 comprising a plurality of panels 12 which are arranged in a multi-sided geometric configuration. The plurality of panels 12 define an interior volume for the receipt of compost material. One panel 14 is openable so as to allow access into the interior 16 of the compost container 14. A first side member 18 is affixed to one end of the plurality of panels 12. A second side member 20 is affixed to an opposite end of the plurality of panels. The first side member 18 and the second side member 20 serve to enclose the interior volume.

As can be seen in FIG. 1 the plurality of panels 12 (including openable panel 14) forms an octagonal configuration. This octagonal configuration was considered ideal after extensive experimentation. The octagonal configuration enhances the ability to mix the compost material on the interior 16 of the container 10. The octagonal configuration serves to "stir" the contents rather than allow the contents to simply slide along the interior of the container 10 when the container 10 is rolled. It has been found that the octagonal shape of the compost container 10 is much more advantageous, with respect to the mixing of the contents, than prior art round containers. Furthermore, the octagonal configuration effectively resisted unintended rolling of the container 10 in the presence of windy conditions.

Figure 2:
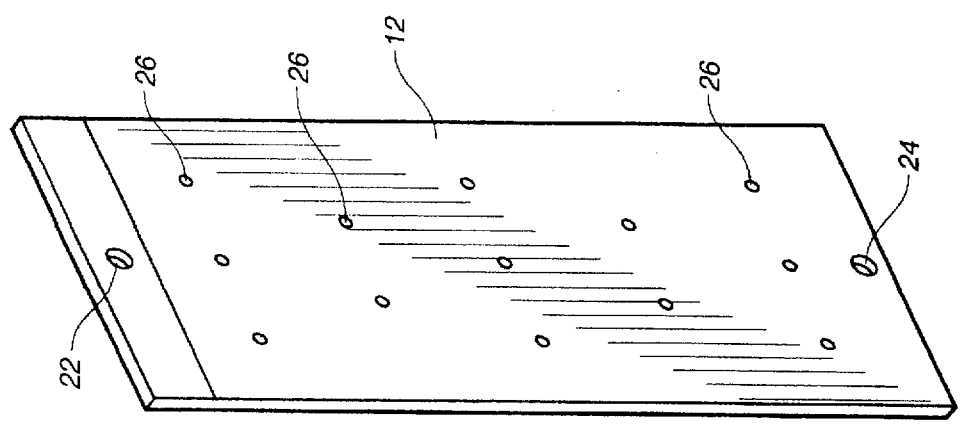
FIG. 2 is an isolated view, in perspective, of a single panel of the compost container of the present invention.

Each of the plurality of panels 12 is illustrated, with particularity, in FIG. 2. With reference to FIG. 2, it can be seen that each of the panels 12 has a generally rectangular configuration. A first hole 22 is formed at one end of the panel 12 and a second hole 24 is formed at the opposite end of the panel 12. Each of the holes 22 and 24 is received within one of the side members 18 and 20. In particular, the holes 22 and 24 will receive a fastener extending therethrough. Typically, the panel 12 is secured to the side members 18 and 20 through the use of bolts, pins, rivets, or other fastening items.

Importantly, in FIG. 2, it can be seen that each of the panels 12 has a plurality of openings 26 formed therein. Openings 26 allow for the introduction of air (and water) into the interior 16 of the compost container 10. So as to facilitate the biological action of the compost, it is necessary for oxygen to mix with the contents. As a result, holes 26 are formed on the panel 12 so as to facilitate the introduction of such oxygen. Furthermore, the holes 26 allow water to be introduced to the interior 16 of the container 10. The holes 26 can allow rain water to enter the interior of the container, or if necessary, the user of the container 10 can simply spray the exterior of the container 10 with water. Both water and air are necessary to the biodegradation of the compost material.

Referring back to FIG. 1, it can be seen that the first side member 18 has a flat surface 28 extending transverse to the plurality of panels 12. The first side member 18 also includes a panel mating means 30 extending transverse to the flat surface 28. The panel mating means 30 allows each of the panels 12 to be attached to the first side member 18. In particular, the panel mating means 30 is a receptacle area which has a slot in the form of the multi-sided geometrical configuration of the compost container 18. One end of the plurality of panels 12 is affixed within the slot of the mating means 30. It can be seen that fasteners 32 will extend through holes on the receptacle area of the first side member 18 and through the hole 22 (as shown in FIG. 2) of the panel 12. As such, each of the panels 12 can be securely received within the first side member 18.

The second side member 20 illustrates with greater particularity the slotted configuration of the mating means 34. It can be seen that the mating means 34 of the second side member 20 includes an inwardly extending surface 36 extending transverse to the flat surface 38 of the second side member 20. Another inwardly extending surface 40 is formed interior of the outer surface 36 so as to define the panel receiving slot 42. The panel receiving slot 42 is part of the receptacle area for the receipt of the opposite end of the panels 12. In normal practice, each of the panels will slide into the slot 42 in their respective locations. A suitable fastener can then be placed through the aperture 44 of the second side member 20 and through the hole 24 of the panel 12. In this manner, the octagonal structure of the container 10 can be easily formed. None of the panels 12 is directly attached to an adjacent panel. Since it is not important to create an air-tight or liquid-tight structure, each of the panels 12 can be in loose contact with each other.

In FIG. 1, the openable panel 14 is particularly illustrated. The openable panel 14 includes a frame panel 50 and a closure panel 52. The frame panel 50 has one end which is affixed to the first side member 18 and an opposite end affixed to the second side member 20. In particular, the ends of the frame panel 50 are received within the slot 42 of the second side member 20. The frame panel 50 includes an interior opening 54 therein. The opening 54 allows access to the interior 16 of the container 10. The closure panel 52 is hingedly connected to the frame panel 50. The closure panel 52 is movable between an open position (illustrated in FIG. 1) and a closure panel in which the closure panel 52 overlies the interior opening 54 of the frame panel 50. The arrows in FIG. 1 illustrate the movement of the closure panel 52.

The closure panel 52 has a first button member 56 at one end and a second button member 58 at an opposite end. Similarly, the frame panel 50 has a button receptacle 60 at one end (adjacent to the first side member 18) and a second button receptacle 62 at an opposite end (adjacent to the second side member 20). When the closure panel 52 is in its closed position, the button receptacle 60 will serve to receive the button 56. Similarly, the button receptacle 62 will receive the button 58. The configuration of buttons 56 and 58 and receptacles 60 and 62 serves to retain the closure panel 52 in its closed position.

Figure 3:
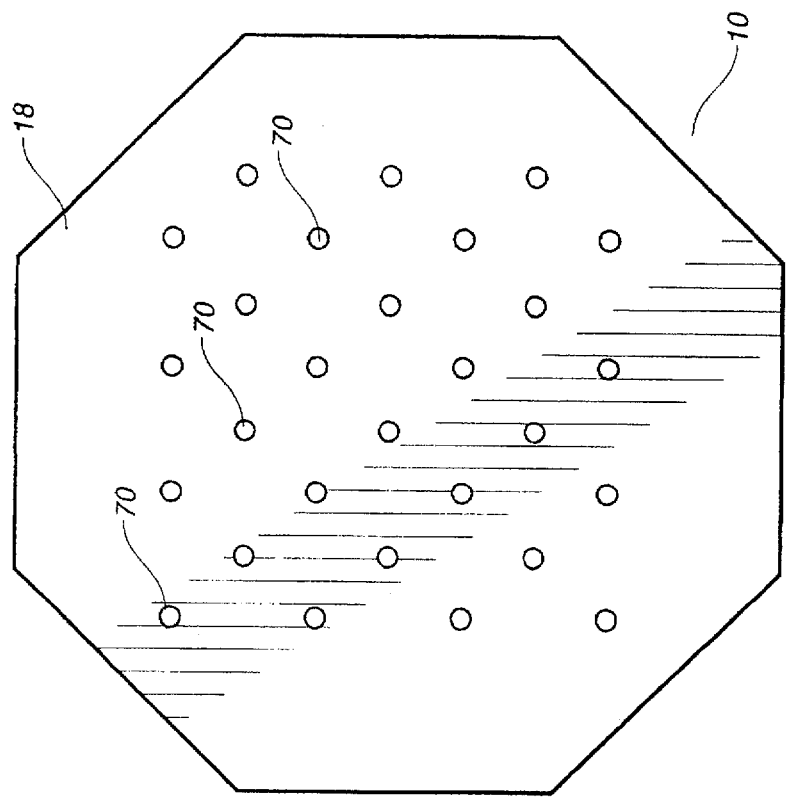
FIG. 3 is an end view of the compost container of the present invention.

FIG. 3 shows an end view of the compost container 10. In particular, the first side member 18 is illustrated in greater detail. It can be seen that the first side member 18 has an octagonal configuration. A plurality of openings 70 are formed across the area of the other side member 18. Openings 70 serve to allow air and water to enter the interior 16 of the compost container 10. As was stated previously, the panels 12 also include such air and water openings. Within the concept of the present invention, so as to allow for the proper biodegradation of the compost material, it is necessary for the openings 26 and 70 to have a total area which is at least 5% of the total area of the plurality of panels 12 (including openable panel 14) and the side members 18 and 20. It is possible, within the concept of the present invention, that all of the openings could appear on the side members 18 and 20 or that all of the openings could appear on the panels 12. It is unimportant where all of the openings appear. The relative area of the openings to the openings of the container is important.

Figure 4:
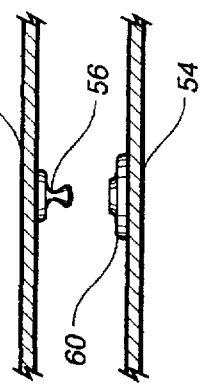
FIG. 4 is an isolated view showing the button connection between the frame panel and the closure panel.

FIG. 4 shows the latching technique for the closure panel 52 with respect to the frame panel 54. The closure panel 52 includes a button 56 extending downwardly therefrom. The frame panel 54 includes a button receptacle 60 extending upwardly therefrom. When the closure panel 52 is lowered, the button 56 will be received by the receptacle 60. A moderate upward force will cause the button 56 to separate from the receptacle 60. Unless a proper lifting force is applied, the closure panel 52 will remain closed over the opening 54 of the frame panel 50.

Figure 5:
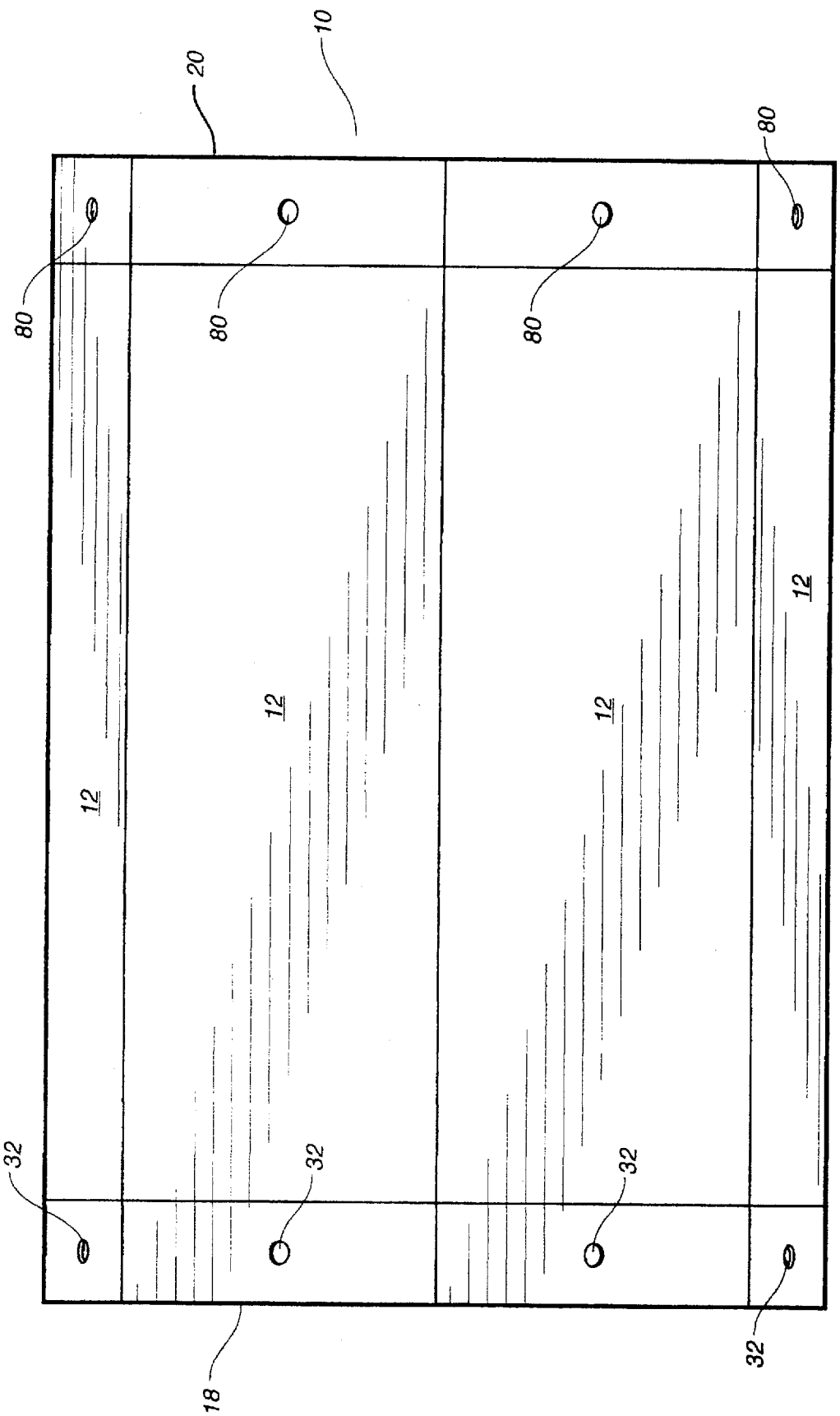
FIG. 5 is a side view of the compost container of the present invention.

FIG. 5 shows the assembled compost container 10. In particular, it can be seen that each of the panels 12 has one end which is received by the first side member 18 and an opposite end which is received by the second side member 20. Fasteners 32 retain one end of the panel 12 within the first side member 18. Similarly, fasteners 80 retain and secure the opposite end of the panels 12 within the second side member 20. As can be seen, the compost container 10 of the present invention can be easily assembled by simply inserting the panels into the slots of the side members. The slots of the side members will define the configuration of the container 10. It is only necessary to slide the panels into the slots of the first side member and then slide the second side member onto the opposite end of the panels in order to form the compost container. Suitable fasteners can then be inserted through the various openings on the side members so as to secure the side members to the ends of the respective panels. In storage and shipping, the panels can be stacked in a relatively flat condition. The side members 18 and 20 can be stacked upon one another. As such, the unassembled compost container 10 occupies very little storage space. The costs of transport should be minimal.

The compost container 10 can receive the compost material in the interior volume. After a period of four or five weeks, the biodegradation process should be complete. The material on the interior of the container can be easily emptied by simply opening the closure panel 52 and rotating the container until the opening 54 is adjacent to the ground. As a result, the contents of the container 10 can be released in an easy and trouble-free manner.

So as to properly store and mix the contents of the container 10, it is only necessary to periodically push on the side of the container 10 to rotate the container 10. This will cause the contents to effectively mix. The openings in the panel allow for air and water to enter the interior of the container so as to facilitate the biodegradation process.

Since the container 10 of the present invention is formed of a polymeric material, there is no concern for rusting or deterioration. Since all of the components can be plastic materials, the exposure to the elements and to the biodegradation process should not affect the longevity or integrity of the container 10.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A compost container comprising:

a plurality of panels arranged in an octagonal configuration, said plurality of panels defining an interior volume for receipt of compost, at least one of said plurality of panels being openable for accessing said interior volume;

a first side member affixed to one end of said plurality of panels; and a second side member affixed to an opposite end of said plurality of panels, said first and second side members enclosing said interior volume, said plurality of panels and said first and second side members having openings formed therein, said openings having a total area of at least 5% of a total surface area of said plurality of panels and said first and second side members, said first side member having a flat surface extending transverse to said plurality of panels, said first side member having a panel mating means extending transverse to said flat surface, said panel mating means for attaching to said one end of said plurality of panels, said panel mating means comprising:

a receptacle area defining a slot in a form of said octagonal configuration, said one end of said plurality of panels affixed within said slot.

2. The compost container of claim 1, each of said plurality of panels having an aperture at said one end and an aperture at said opposite end.

3. A compost container comprising:

a plurality of panels arranged in an octagonal configuration, said plurality of panels defining an interior volume for receipt of compost, at least one of said plurality of panels being openable for accessing said interior volume;

a first side member affixed to one end of said plurality of panels; and a second side member affixed to an opposite end of said plurality of panels, said first and second side members enclosing said interior volume, said first side member having a flat surface extending transverse to said plurality of panels, said first side member having a panel mating means extending transverse to said flat surface, said panel mating means of said first side member for attaching to said one end of said plurality of panels, said second side member having a flat surface extending transverse to said plurality of panels, said second side member having a panel mating means extending transverse to said flat surface, said panel mating means of said second side member for attaching to said opposite end of said plurality of panels, said panel mating means of said first side member comprising:

a receptacle area defining a slot in a form of said octagonal configuration, said one end of said plurality of panel affixed within said slot.

4. The compost container of claim 3, said panel mating means of said second side member comprising a receptacle area defining a slot in a form of said multi-sided geometric configuration, said opposite end of said plurality of panels affixed within said slot.

5. A compost container comprising:

a plurality of panels arranged in an octagonal configuration, said plurality of panels defining an interior volume for receipt of compost, at least one of said plurality of panels being openable for accessing said interior volume;

a first side member affixed to one end of said plurality of panels; and a second side member affixed to an opposite end of said plurality of panels, said first and second side members enclosing said interior volume, said first side member having a flat surface extending transverse to said plurality of panels, said first side member having a panel mating means extending transverse to said flat surface, each of said plurality of panels being a flat polymeric panel having an aperture at said one end and an aperture at said opposite end, said first side member having a flat surface extending transverse to said plurality of panels and an inwardly extending surface, said inwardly extending surface having a hole aligned with said aperture of said panel, said panel mating means of said first side member comprising:

a receptacle area defining a slot in a form of said octagonal configuration, said one end of said plurality of panel affixed within said slot; and a fastener means extending through said hole and through said aperture, said fastener means for affixing said panel to said inwardly extending surface.

* * * * *